United States Patent [19]

Alburger

[11] 3,912,653

[45] Oct. 14, 1975

[54] WATER-SOLUBLE INSPECTION PENETRANT COMPOSITION EMPLOYING DIMETHYL NAPHTHALENE

[76] Inventor: James R. Alburger, 5007 Hillard Ave., La Canada, Calif. 91011

[22] Filed: Aug. 6, 1973

[21] Appl. No.: 385,795

Related U.S. Application Data

[63] Continuation-in-part of Ser. No. 127,681, March 24, 1971, which is a continuation-in-part of Ser. No. 787,381, Dec. 27, 1968, abandoned, which is a continuation-in-part of Ser. No. 675,896, Oct. 17, 1967, Pat. No. 3,429,826, which is a continuation-in-part of Ser. No. 520,393, Jan. 14, 1966, Pat. No. 3,282,843, which is a continuation-in-part of Ser. No. 256,128, Feb. 4, 1963, abandoned.

[52] U.S. Cl. .................. 252/408; 73/104; 73/105; 252/49.5; 252/312; 252/301.2 P
[51] Int. Cl.² ................ C09K 3/00; G01N 31/00; G01N 33/00; C09K 11/00
[58] Field of Search ............ 252/408, 301.2 P, 312, 252/49.5; 73/104

[56] References Cited
UNITED STATES PATENTS

| | | | |
|---|---|---|---|
| 3,282,843 | 11/1966 | Alburger | 252/301.2 P |
| 3,311,479 | 3/1967 | Alburger | 252/301.2 P |
| 3,349,041 | 10/1967 | Alburger | 252/408 |
| 3,386,920 | 6/1968 | Alburger | 252/301.2 P |
| 3,429,826 | 2/1969 | Alburger | 252/408 X |
| 3,543,570 | 12/1970 | Mlot-Fijalkowski | 252/301.2 P |
| 3,558,882 | 1/1971 | Mlot-Fijalkowski | 73/104 X |
| 3,636,759 | 1/1972 | Alburger | 252/301.2 P |
| 3,647,705 | 3/1972 | Mlot-Fijalkowski | 252/301.2 P |
| 3,751,970 | 8/1973 | Alburger | 252/301.2 P |

*Primary Examiner*—Benjamin R. Padgett
*Assistant Examiner*—T. S. Gron

[57] ABSTRACT

Water-emulsifiable and gel-forming inspection penetrant compositions consisting essentially of four ingredients used in appropriate relative concentrations, the ingredients being: (1) a light mineral oil having an aniline point between about 150° and 200° F., (2) a normally liquid nonionic surfactant having an HLB value within the range of about 10 to 20, (3) an aromatic solvent consisting essentially of a mixture of isomers of dimethyl naphthalene, and (4) an indicator dye, the relative proportion of the dimethyl naphthalene constituent being adjusted to a point sufficient to maintain the surfactant ingredient in clear solution at temperatures ranging from room temperature down to about 20° F.

3 Claims, No Drawings

WATER-SOLUBLE INSPECTION PENETRANT COMPOSITION EMPLOYING DIMETHYL NAPHTHALENE

This application is a continuation-in-part of my copending application Ser. No. 127,681, filed Mar. 24, 1971, for "Inspection Penetrant Compositions and Processes Employing Balanced Surfactant/Synergist Detergent Systems", which application was a continuation-in-part of application Ser. No. 787,381, filed Dec. 27, 1968, now abandoned for "Oil-Water Compatible Compositions and Methods of Preparing Same", which second application was a continuation-in-part of application Ser. No. 675,896, filed Oct. 17, 1967, now issued U.S. Pat. No. 3,429,826, for Gel-Forming Cel-Forming Inspection Penetrant and Emulsifier Compositions Employing Hydrophilic and Lipophilic Surfactants", which third application was a continuation-in-part of a copending application Ser. No. 520,393, filed Jan. 14, 1966, now issued U.S. Pat. No. 3,282,843, for "Emulsifier Compositions", which fourth application was in turn a continuation-in-part of application Ser. No. 256,128, filed Feb. 4, 1963, now abandoned for "Emulsifier Compositions".

RELATED PATENTS AND PATENT APPLICATIONS

U.S. Pat. No. 3,107,298 — "Apparatus for the Measurement of Fluorescent Tracer Sensitivity".

U.S. Pat. No. 3,164,006 — "Evaluation Performance of Liquid Penetrant Tracer Materials".

U.S. Pat. No. 3,282,843 — "Emulsifier Compositions".

U.S. Pat. No. 3,300,642 — "Method for Changing and Restoring the Sensitivity Characteristics of Diluted Penetrants".

U.S. Pat. No. 3,311,479 — "Penetrant Inspection Process and Compositions".

U.S. Pat. No. 3,349,041 — "Gel-Forming Inspection Penetrant and Emulsifier Compositions".

U.S. Pat. No. 3,386,920 — "Process for Fluorescence Detection of Extremely Small Flaws".

U.S. Pat. No. 3,422,670 — "Cleaning Process and Compositions for Pest-Emulsifier Inspection Penetrants".

U.S. Pat. No. 3,429,826 — "Gel-Forming Inspection Penetrant and Emulsifier Compositions Employing Hydrophilic and Lipophilic Surfactants".

The present invention relates to a specific category of inspection penetrant compositions which has been broadly disclosed in my copending appln. Ser. No. 127,681. In this parent appln., and in previous patents such as the above-mentioned U.S. Pat. Nos. 3,282,843, 3,349,041, and 3,429,826, all of which are or have been copending in an uninterrupted sequence, I have disclosed a novel concept relative to the formation of detergent constituents in water-soluble oily compositions.

This concept concerns the use of a balanced mixture of water-soluble surfactant liquid and oil-soluble synergist liquid, the presence of these ingredients in an oil providing the feature of rendering the normally water-insoluble oil emulsifiable in water, and compatible with water to the extent that water from about 0.1% up to 10% or more may be maintained in clear solution in the detergent/oil mixture. These oil-water-compatible mixtures are particularly adaptable for use as inspection penetrant compositions for the reason that they exhibit a feature of "gel-formation" which provides a condition of high efficiency in the retention of entrapments of the penetrant liquid in surface cracks or other flaws.

Penetrant inspection processes have been well known in the prior art and have had as their purpose the detection in test bodies of extremely small surface discontinuities and subsurface flaws having surface openings. The test bodies, or parts, may be constructed of metal, ceramic, or other material. The known processes have involved nondestructive inspection penetrant testing procedures, with the usual procedure including, as a first step, the immersion of the test bodies in a penetrant flaw tracer liquid having dissolved therein either a fluorescent dye or a nonfluorescent visible dye. The penetrant flaw tracer liquid usually employed has been formulated of an oily liquid vehicle (such as refined kerosene or base oil), within which vehicle the dye is dissolved.

After immersion of the test bodies in the penetrant liquid for an appropriate dwell period, the test bodies are withdrawn from the liquid and are then subjected to draining, emulsification, and washing operations, for the purpose of removing any penetrant liquid adhering to the surfaces thereof. Minute entrapments of the penetrant liquid, however, remain in any surface discontinuities or subsurface flaws having surface openings, even though extremely small. If the penetrant liquid employed contains a fluorescent dye, the entrapments may be rendered visible by exposure of the surfaces of the test bodies to ultraviolet radiation. If, on the other hand, the penetrant liquid contains a nonfluorescent visible-color dye, the entrapments can be viewed in ordinary light.

Two major types of penetrant inspection processes have been utilized. In the case of the so-called "post-emulsifier" type of penetrant inspection process, the penetrant inspection liquid is removed from the surfaces of the test bodies during the washing step through the use of water together with a suitable emulsifier composition. In accordance with the so-called "self-emulsifiable", or water-washable, type of penetrant process, the oily vehicle of the penetrant flaw tracer liquid is compounded together with one or more detergents. As a result, upon contact with water, the penetrant liquid forms an emulsion. Consequently, after the test bodies have been immersed in the penetrant liquid, they may simply be rinsed in water, whereupon the surface penetrant liquid becomes emulsified and is removed without the use of a supplementary emulsifier composition.

The conventional oil-phase penetrant liquids of the water-washable type, as well as the oil-phase emulsifiers employed in the conventional post-emulsifier penetrant processes, present a number of disadvantages in use. Firstly, the emulsions which form during the washing step are often not completely stable, so that, as a result, oil and water phase separation often occurs, leading to a re-precipitation of nonemulsified materials on the surfaces being cleaned. Secondly, the presence of the oily re-precipitated residues, not being again soluble in water, may lead to undesirable effects, such as intergranular corrosion, or chemical reactivity in the case of test bodies being used in liquid oxygen systems.

As a further disadvantage of a water-washable penetrant of the conventional type such materials can provide a high level of flaw entrapment efficiency only of the solubilizing strength of the detergent system is just sufficient, and no greater, to render the oily component of the penetrant liquid emulsifiable in water. If the solubilizing strength of the detergents used is too great, the flaw entrapments are too readily emulsified and substantial portions thereof may be removed from the flaws by the water employed during the washing step. In view of the relatively low solubilizing strength of the detergent systems utilized, the known water-washable penetrants have often presented problems with regard to re-precipitation and emulsion instability.

In any event, known types of water-washable penetrants have not provided satisfactory uniformity or predictability in the control of features of emulsion stability or flaw entrapment efficiency.

I have discovered that certain combinations of oil, surfactant, and synergist constituents, which will be described, provide desirable features of gel-formation and emulsion formation, In addition, I have discovered that by adjusting the surfactant content of the composition to a desired point within the range of from about 1% up to about 40%, it is possible to provide a controlled and predictable feature of "Indication Depletion Time Constant". This feature is a practical index of "Flaw Entrapment Efficiency".

In connection with the feature of flaw detection performance of a water-washable inspection penetrant, and even post-emulsifier type penetrants and solvent remover type penetrants, I have discovered a hitherto unrecognized performance parameter, and I have reported this discovery in several technical papers presented before the American Society for Nondestructive Testing. Also, requirements pertaining to this performance parameter of "Indication Depletion Time Constant" have been included in applicable Military and Industrial penetrant material specifications.

In essence, I have found that when tested using a standardized crazecracked panel, each water-washable inspection penetrant exhibits a characteristic rate of depletion of penetrant entrapments upon contact with water remover. Since this depletion follows an exponential curve, it is possible to assign a "depletion time constant" to a given characteristic curve. Although the Indication Depletion Time Constant may be expressed in various ways, present practice is to state a given Indication Depletion Time Constant as the time in seconds of remover contact for the brightness of a standardized indication pattern (using a fluorescent penetrant) to become diminished to 50% of its initial brightness. It will be understood that water is the remover employed with water-washable inspection penetrants, while in the case of water-insoluble oily penetrants, the remover may be a solvent such as a mineral thinner, or it may be an emulsifier consisting of an oily composition containing a detergent constituent. It will also be understood that the water-washable penetrant compositions of the invention may be used as emulsifiers in conjunction with post-emulsifier type penetrants. When so used, indicator dyes are generally omitted from the composition, since an indicator dye is present in the postemulsifier type penetrant.

The parameter of Indication Depletion is important with regard to the flaw detection performance of a given penetrant, since it determines the so-called "stability" of indications in the presence of a remover. It will be understood that for different inspection processes and for different kinds of test parts, it may be found that distinctly different conditions of Indication Depletion Time Constant may be desirable. Thus, it is important to exercise a control over the feature of Indication Depletion Time Constant.

I have found that the Indication Depletion Time Constant value of the inspection penetrant compositions of the invention may be accurately controlled and adjusted to a desired condition by adjusting the concentration of the surfactant constituent of the composition, as will be described. I have also found that by employing the synergist material, an aromatic solvent consisting essentially of a mixture of isomers of dimethyl naphthalene, in an amount just sufficient to maintain the surfactant constituent in clear solution in the oily penetrant vehicle at temperatures ranging from room temperature down to about 20° F., it is possible to achieve optimum conditions of gel formation upon contact with water, along with other desirable features such as low product cost and economy in use.

The principal object of the invention, therefore, is to provide an improved water-emulsifiable inspection penetrant composition which may be easily and accurately controlled with respect to flaw detection performance and the stability of indications in the presence of wash water.

This and other objects of the invention will be made more apparent in the following description thereof.

The basic concept of balanced surfactant/synergist inspection penetrant and emulsifier compositions was disclsoed in my U.S. Pat. No. 3,282,843, for "Emulsifier Compositions", the surfactants employed being water-soluble ethoxylated alkylphenols and the synergists being oil-soluble ethoxylated alkylphenols. A glycol-ether common solvent coupler was employed in the aforesaid compositions. All of the compositions of the U.S. Pat. No. 3,382,843 are characterized by the feature of pronounced gel-formation upon contact with water.

In a subsequent continuation-in-part application, new U.S. Pat. No. 3,349,041, for "Gel-Forming Inspection Penetrant and Emulsifier Compositions", the basic concept of balanced surfactant/synergist gel-forming inspection penetrants was extended to compositions containing glycol extender constituents.

In a still later continuation-in-part application, Now U.S. Pat. No. 3,429,826, for "Gel-Forming Inspection Penetrant and Emulsifier Compositions Employing Hydrophilic and Lipophilic Surfactants", the concept of balanced surfactant/synergist gel-forming inspection penetrants was extended to compositions containing a wide variety of hydrophilic surfactant materials and lipophilic synergist constituents as substitutes for the ethoxylated alkylphenols of the original U.S. Pat. No. 3,282,943. In this last U.S. Pat. (No. 3,429,826), a relativeley large proportion of the penetrant composition (40% to 100%) consisted of the balanced mixture of surfactant and synergist ingredients.

Finally, in the parent appln., Ser. No. 127,681, of which this appln. is a continuation-in-part, I have extended the concept of balanced surfactant/synergist compositions to a broad range of chemical substances. Among the synergist substances thus disclosed is the material dimethyl naphthalene which is an essential ingredient of the inspection penetrant compositions of the invention.

The inspection penetrant compositions of the invention consist essentially of four ingredients: (1) an inert oil vehicle, (2) a water-soluble surfactant liquid, (3) a synergist liquid consisting essentially of dimethyl naphthalene, and (4) an indicator dye. These ingredients will be described and defined as follows:

The first ingredient, and one which is usually not necessarily present in a major proportion, is a light mineral oil. Suitable oils are known commercially as "base oils", "pacific base oils", "white oils", or "light lube oils". They are available in various distillate fractions and flash points, in ranges slightly above the range of kerosene and diesel fuel. Viscosities may range from about 50 cst. (100° F.) up to 750 cst. (at 100° F.) or more. Although any of these lube-type oils may be used as the oil vehicle ingredient of the penetrant compositions of the invention, the lighter grades of the oils are preferred. One suitable preferred oil is marketed by Standard Oil Co. of California under the designation "Base Oil 50 Pale". Another suitable oil is marketed under the designation "No. 1 White Oil". This latter oil is a purified material from which sulfur-bearing compounds and various discolorants have been removed.

The various light mineral oils suitable for use in the compositions of the invention are all characterized by aniline points in the range of from about 150° F. up to about 200° F. Anilie point is an inverse measure of aromaticity, and therefore these oils which have high aniline points are considered to be "low" in their aromatic properties.

Light mineral oils may vary depending on the crude stocks from which they are derived, however for the purpose of the present invention it is sufficient to describe and define the oils in terms of aniline point, it being understood that we are dealing with a low viscosity lube-type oil having a distillation range slightly above that of diesel fuel.

The second essential ingredient is a water-soluble surfactant liquid. There are many hundreds of different surfactant liquids which are known, and these materials may exhibit varying degrees of oil and water compatibility. In connection with the evaluation of the lipophilic and hydrophilic character of surfactant materials (oil and water compatibility), Atlas Powder Company, Chemicals Division, has devised a method of rating, known as the HLB System (or Hydrophile-Lipophile Balance). Numerical HLB values have been assigned to many commercially available surfactants, those which are insoluble in water having HLB values between zero and 10, and those which are soluble in water having HLB values between 10 and 20.

For purposes of this invention, any surfactant material having an HLB value between 10 and 20 may be utilized, although preferred materials exhibit HLB values in the range of about 15. Exemplary of a preferred type of surfactant material is ethoxylated nonylphenol containing about 10 mols of ethylene oxide per mol of nonylphenol. It will be understood that any of the many available ethoxylated alkylphenols, ethoxylated higher alcohols, and the like, may be employed in the compositions of the invention, provided only that the HLB value falls within the range of 10 to 20 as stated above. In some special cases certain surfactant materials may be found to exhibit surfactant characteristics which place their effective HLB values beyond the range of the HLB Scale, at 25 or 30 for example. It will be understood that such materials are considered to have HLB values equivalent to 20 on the HLB Scale. Normally, such materials having extremely high values of HLB are not liquid at room temperature, and are therefore not preferred for use in the penetrant compositions of the invention.

The third ingredient is dimethyl naphthalene (sometimes known commercially as DMN). DMN is available commercially in the form of solvent blends in which the dimethyl naphthalene content may vary from as much as 95% or more down to 50% or less. The dimethyl naphthalene, itself, is usually present in the form of a mixture of isomers, since it is not economically practical, or even necessary, to separate the isomers. Analysis of a typical DMN Solvent Blend may show the following:

| Naphthalene | 1.9 % |
|---|---|
| 1-Methyl Naphthalene | 19.2 % |
| 2-Methyl Naphthalene | 7.8 % |
| 1.4-Dimethyl Naphthalene | 34.6 % |
| 2.3-Dimethyl Naphthalene | 12.4 % |
| 1.2-Dimethyl Naphthalene | 2.6 % |
| 2.4-Dimethyl Naphthalene | 15.7 % |
| 2.6-Dimethyl Naphthalene | 1.2 % |
| Polyaromatics | 4.2 % |

It will be understood that even though there may be substantial amounts of inert oils or solvents present in a DMN solvent blend, the "active" ingredient in such blends is dimethyl napthalene. Hence, it is sufficient to describe and define such materials as "dimethyl naphthalene" or "isomers of dimethyl naphthalene".

The fourth ingredient is an indicator dye. As already stated (supra), if the composition of the invention is to be used as an emulsifier remover in conjunction with post-emulsifier type penetrants, then the dye ingredient may be omitted from the composition. On the other hand, if the composition is to be used as a water-washable inspection penetrant, then an indicator dye is dissolved in the composition, and its concentration is adjusted in accordance with known practices so as to provide a desired "dye performance" characteristic.

The use of fluorescent and visible-color indicator dyes in inspection penetrants has been extensively covered in the patent literature, to wit my above-mentioned U.S. Pat. Nos. 3,107,298, 3,300,642, and 3,386,920. In addition, the technical literature is replete with discussions concerning the use of fluorescent and visible dye indicators. It will be understood that any suitable indicator dye may be utilized in the compositions of the invention, and that such dyes may be employed in accordance with known methods and at known concentrations. In accordance with present practice, indicator dyes may be used at concentrations as high as 10% or more in the case of ultra-sensitive penetrant compositions, down to as little as 0.05% for low sensitivity penetrants. As already stated, the indicator dye may be omitted for certain usages (as in the case of emulsifier usage). Thus, the indicator dye may be present at concentrations ranging from zero up to about 10%.

The following example illustrates the preferred procedure for compounding a water-washable inspection penetrant composition of the invention.

EXAMPLE I

An "A-Format" water-washable penetrant composition was formulated as follows: 20.5 gallons of light mineral oil was mixed with 13.5 gallons of 10 mol ethoxylated nonylphenol surfactant, forming a hazy mixture. The mineral oil was a so-called "base oil 50 pale" having an aniline point of about 180° F., and the ethoxylated nonylphenol had an HLB value of about 15.

Dimethyl naphthalene (DMN) solvent was added to the hazy mixture of oil and surfactant, up to the point where a clear solution was formed at room temperature. It was found that about 16 gallons of the DMN solvent was sufficient to clear the haze and produce a transparent solution. The amount of DMN was increased to about 18 gallons, and it was found that the solution remained clear down to a temperature of about 50° F., but below this temperature a haze again formed. It was found that about 21 gallons of DMN were sufficient to depress the cloud point (haze point) of the mixture to a point below 30° F. Water tolerance of the final mixture was found to be about 10.5%.

The composition thus formulated was found to be a satisfactory emulsifier when used in the post-emulsifier process. A fluorescent indicator dye was added to the composition to provide a medium level of dye performance sensitivity, and the resulting penetrant was tested as to the rate of indication depletion upon contact with wash water. It was found that this "A-Format" penetrant provided a relatively rapid rate of indication depletion, suitable for inspection operations requiring rapid removal of background porosity indications from rough test surfaces.

EXAMPLE II

A "B-Format" penetrant composition was prepared as follows: 23.5 gallons of light mineral oil (50 pale) were mixed with 8.5 gallons of 10 mol ethoxylated nonylphenol surfactant, forming a hazy mixture. DMN solvent was added in an amount sufficient to clear the haze at room temperature, the amount required being about 15 gallons. A further addition of DMN, up to a total of 21 gallons, lowered the cloud point of the composition to about 25° F. Water tolerance of the final mixture was found to be about 5%.

This "B-Format" composition was found to be a satisfactory emulsifier when used in the post-emulsifier process. A fluorescent indicator dye was added to the composition to provide a medium level of dye performance sensitivity, and the resulting penetrant was tested as to the rate of indication depletion upon contact with wash water. It was found that this "B-Format" penetrant exhibited a medium rate of indication depletion, suitable for inspection operations on medium-smooth test parts.

EXAMPLE III

A "C-Format" penetrant composition was prepared as follows: 30 gallons of light mineral oil (50 pale) were mixed with 3 gallons of 10 mol ethoxylated nonylphenol surfactant, forming a hazy mixture. DMN solvent was added in an amount sufficient to clear the haze at room temperature, the amount required being about 20 gallons. A further addition of DMN, up to a total of 22 gallons, lowered the cloud point of the composition to a point below 30° F. Water tolerance of the final mixture was found to be about 1.2%.

This "C-Format" composition was found to be a satisfactory emulsifier when used in the post-emulsifier process. A fluorescent indicator dye was added to the composition to provide a medium level of dye performance sensitivity, and the resulting penetrant was tested as to the rate of indication depletion upon contact with wash water. It was found that this "C-Format" penetrant exhibited a low rate of indication depletion, suitabe for inspection operations on smooth test parts having relatively shallow surface discontinuities.

EXAMPLE IV

A "D-Format" penetrant composition was prepared as follows: 39.5 gallons of light mineral oil (50 pale) were mixed with 0.5 gallon of 10 mol ethoxylated nonylphenol surfactant, forming a hazy mixture. DMN solvent was added in an amount sufficient to clear the haze at room temperature, the amount required being about 15 gallons. With this amount of DMN solvent, the cloud point of the composition was found to be about 50° F. Water tolerance of the composition was found to be somewhat below 0.5%.

This "D-Format" composition was found to be a satisfactory emulsifier when used in the post-emulsifier process. A fluorescent indicator dye was added to the composition to provide a medium level of dye performance sensitivity, and the resulting penetrant was tested as to the rate of indication depletion upon contact with wash water. It was found that the rate of indication depletion was slightly greater than that of the "C-Format" material. When compared with the "C-Format" penetrant at the same dye performance level, it was found that this "D-Format" penetrant showed slightly less stability of flaw entrapments in the presence of wash water, and the ratio of brightness of actual crack indications with respect to background brightness was slightly less. From this, it was concluded that the "C-Format" composition provides maximum performance with regard to "signal-to-noise ratio" in the detection of crack defects in the presence of background indications.

It was observed that the "D-Format" liquid vehicle composition had a reduced ability to dissolve fluorescent tracer dyes at high concentrations, as compared with the "A", "B", and "C-Format" materials. It was therefore concluded that the lowest practical concentration of surfactant is about 1%, and the lowest useful concentration of DMN solvent is about 27%, that is when these materials are used with a mineral oil having an aniline point in the range of 180° F. If the aniline point of the oil is lower, in the range of 150° F., for example, the lowest useful concentration of DMN solvent may be in the range of about 20%.

Numerous tests were made using various kinds of commercially available oils and surfactants, and it was found that such materials having different chemical structures are essentially interchangeable, provided that their significant performance properties such as aniline point in the case of the oil vehicle, and HLB value in the case of the surfactant constituent, fall within the ranges set forth herein. As already stated, any suitable indicator dye or combination of dyes, visible color or fluorescent, may be utilized, and such dyes may be employed in accordance with known techniques and at known concentrations.

It will be understood that the effect of the DMN solvent is to lower the aniline point of the oil/DMN mixture. In order for this oil/DMN combination to be effective in forming clear mixtures with a surfactant liquid in which the HLB value is within the range of 10 to 20, as specified, the aniline point of the oil/DMN mixture must be reduced to a value below about 145° F. Obviously, less DMN will be required to accomplish this purpose in the case of a "low-aniline-type" oil than in the case of a "high-aniline-type" oil.

I have found that the three liquid ingredients of the compositions of the invention may be present at concentrations falling within the ranges set forth as follows: The oil ingredient may be present at proportional concentrations from about 79% down to about 20% (weight percentages). The nonionic surfactant ingredient may be present at proportional concentrations from about 1% to 40%. The dimethyl naphthalene (DMN) ingredient may be present at proportional concentrations from about 20% to 40%.

In formulating the compositions of the invention, it may sometimes be desired to provide a cloud point of the mixture falling in the range of 30° F. up to about 70° F. (room temperature), as illustrated by Example IV. The penetrant compositions of the invention will function properly at any temperature above the cloud point, but at temperatures below the cloud point, where a haze forms in the composition, a phase separation takes place, and upon prolonged standing the composition will separate into two layers, oil and surfactant respectively.

In view of the fact that penetrant materials must often be shipped and/or stored under low temperature conditions (depending on the weather conditions), it is preferable to adjust the cloud point to a temperature at least below about 30° F., an optimum design cloud point being about 20° F. In this way, the composition will remain stable without phase separation, at least down to reasonably low temperatures which might be encountered in shipping and storage.

It is not desirable to depress the cloud point of the compositions of the invention to a point much below about 20° F., although this can sometimes be done without detrimental results. When the cloud point is depressed much below 20° F., the value of the cloud point is difficult to determine accurately, and it becomes possible to arrise at a cloud point excessively below the optimum value of about 20° F. If this should occur, as the result of adding an excessive amount of DMN solvent, the final mixture may exhibit a characteristic of non-washability, so that unremoved residues of penetrant will remain on the surfaces of test parts after washing.

Although the invention has been described with reference to particular embodiments thereof, it will be understood that various changes may be made therein without departing from the spirit of the invention or the scope of the appended claims.

I claim:
1. A water-emulsifiable penetrant composition adapted for use in the penetrant method for detection of surface discontinuities, said composition consisting essentially of:
  1. from 20 to 79 parts by weight of a light mineral oil having an aniline point within the range of about 150° F. to 200° F.,
  2. from 1 to 40 parts by weight of a normally liquid nonionic surfactant having an HLB value within the range of about 10 to 20,
  3. from 20 to 40 parts by weight of an aromatic solvent consisting essentially of a mixture of isomers of dimethyl naphthalene, and
  4. from zero to 10 part by weight of an indicator dye, the proportional concentration of said aromatic solvent being sufficient to provide a cloud point of the mixture within a temperature range of from about 70° F. down to about 20° F.

2. A water-emulsifiable penetrant composition in accordance with claim 1 in which said indicator dye is a fluorescent dye.

3. A water-emulsifiable penetrant composition in accordance with claim 1 in which said indicator dye is a visible color dye.

* * * * *